(12) United States Patent
Nishio et al.

(10) Patent No.: US 8,669,955 B2
(45) Date of Patent: Mar. 11, 2014

(54) PORTABLE DISPLAY DEVICE, METHOD OF CONTROLLING PORTABLE DISPLAY DEVICE, PROGRAM, AND RECORDING MEDIUM

(75) Inventors: Masaaki Nishio, Osaka (JP); Yoshirou Kataoka, Osaka (JP); Kouji Kumada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 208 days.

(21) Appl. No.: 13/387,618

(22) PCT Filed: Mar. 19, 2010

(86) PCT No.: PCT/JP2010/054808
§ 371 (c)(1),
(2), (4) Date: Jan. 27, 2012

(87) PCT Pub. No.: WO2011/013400
PCT Pub. Date: Feb. 3, 2011

(65) Prior Publication Data
US 2012/0127109 A1    May 24, 2012

(30) Foreign Application Priority Data

Jul. 30, 2009   (JP) ................................. 2009-177320

(51) Int. Cl.
    *G06F 3/048*        (2013.01)
(52) U.S. Cl.
    USPC .............................. 345/173; 345/1.1; 345/1.3
(58) Field of Classification Search
    None
    See application file for complete search history.

(56) References Cited

U.S. PATENT DOCUMENTS

| 5,511,148 A | 4/1996 | Wellner |
| 8,385,885 B2 * | 2/2013 | Hainzl ........................ 455/411 |
| 2006/0034042 A1 | 2/2006 | Hisano et al. |
| 2012/0229406 A1 * | 9/2012 | Wu .............................. 345/173 |

FOREIGN PATENT DOCUMENTS

| JP | 7-168949 | 7/1995 |
| JP | 2001-517813 | 10/2001 |
| JP | 2006-53678 | 2/2006 |

OTHER PUBLICATIONS

International Search Report, mailed Jun. 29, 2010, directed to International Application No. PCT/JP2010/054808; 2 pages.

* cited by examiner

*Primary Examiner* — Joseph Haley
(74) *Attorney, Agent, or Firm* — Keating & Bennett, LLP

(57) ABSTRACT

Provided is a portable display device sufficiently small to be held with one hand that enters a state for accepting a gesture when a fixed coordinate position near a central portion between a left display unit (14a) and a right display unit (14b) is pressed with a thumb Ftl of one hand holding the device, and accepts a command for performing such as page flipping processing based on a gesture inputted with an index finger Ffr of the other hand. Thus, it is possible to achieve an interface for input operations suitable for a two-screen display screen, where holding a two-screen portable display device naturally causes the device to enter a command accepting state to allow gesture recognition, and to enter a command non-accepting state when the portable display device is not held, in order to prevent a command from being falsely executed due to an unintended contact and such to the display screen.

12 Claims, 11 Drawing Sheets

PORTABLE DISPLAY DEVICE, METHOD OF CONTROLLING PORTABLE DISPLAY DEVICE, PROGRAM, AND RECORDING MEDIUM

REFERENCE TO RELATED APPLICATIONS

This application is a national stage application under 35 USC 371 of International Application No. PCT/JP2010/054808, filed Mar. 19, 2010, which claims the priority of Japanese Application No. JP2009-177320, filed Jul. 30, 2009, the contents of which prior applications are incorporated herein by reference.

FIELD OF THE INVENTION

The present invention relates to portable display devices, and in particular to a portable display device having a two-screen display unit and a touch panel capable of detecting coordinates on the display unit that are subjected to approach, contact, or press.

BACKGROUND OF THE INVENTION

In recent years, an increasing number of portable display devices requiring operations such as menu selection are provided with a touch panel with which an operation such as selection of a desired menu is accepted by pressing the panel using a stylus pen or a finger according to the display in the screen. Such portable display devices employ various well-known methods, such as a resistive type, an electrostatic capacitance type, an optical sensor type, and an infrared type, in order to specify a position that has been pressed of the panel.

Further, in recent years, a display screen of such portable display devices is configured by two screens (typically, center spread), as it is preferable that the display screen account for a larger portion of a housing surface. Moreover, some displays are configured such that two screens are connected without a seam (seamlessly).

Japanese Patent Application Laid-open No. 2006-53678 discloses a structure of a notebook computer having such a two-screen touch panel, and a configuration of a user interface, such as a virtual keyboard and a virtual mouse, on a display screen of the device.

PRIOR ART DOCUMENT

Patent Document

[Patent Document 1] Japanese Patent Application Laid-open No. 2006-53678

SUMMARY OF THE INVENTION

In this case, among the conventional portable display devices as described above, a notebook computer and such are assumed to be used while being placed on such as a desk in use even though such a device is portable, and it is preferable to employ a configuration for such a device in which an interface screen such as a virtual keyboard or a virtual mouse is displayed to accept an input.

However, in a case of a portable display device that is used with one hand, such as a mobile telephone terminal or a PDA (Personal Digital Assistant) device, it is not necessarily suitable for such a device to be operated through a virtual keyboard or a virtual mouse.

Further, in a case of a device or application software (also referred to as an electronic book) that is intended to use both of the two screens as a display screen, such as a device or application software for presenting an electronic document in a two-page center spread manner like a printed book, displaying the virtual keyboard or the virtual mouse on the display screen interferes the view, and therefore a method for more suitably accepting an input operation is required.

Thus, an object of the present invention is to provide a portable display device that is sufficiently small to be held with one hand and provided with an interface for an input operation suitable for a two-screen display screen, a method of controlling the portable display device, a program, and a recording medium.

A first aspect of the present invention provides a portable display device configured to be held by a user, the device including:
a display unit configured to display images respectively in two adjacent screens;
an input unit configured to obtain two or more coordinates of positions on the display unit, the positions being subjected to one of approach, contact, and press by the user; and
a gesture recognizing unit configured to recognize and execute a previously stored processing command corresponding to a changing form of two or more related coordinates by chronologically associating the coordinates of the positions subjected to one of approach, contact, and press on the display unit and obtained in the input step, wherein
the gesture recognizing unit enters: a non-accepting state in which recognition and execution of the processing command are unallowed when the coordinates obtained in the input step do not include a predetermined fixed coordinate, and an accepting state in which recognition of the processing command is allowed when the coordinates obtained by the input unit include the fixed coordinate.

According to a second aspect of the present invention, in the first aspect of the present invention,
the gesture recognizing unit executes the processing command based on the fixed coordinate that have been previously determined, the fixed coordinate being at or near a portion at which the two screens are adjacent.

According to a third aspect of the present invention, in the first aspect of the present invention,
the input unit obtains, as the fixed coordinate, a coordinate of a position on the display unit that is corresponding to a position of one hand finger of the user holding the portable display device and that is corresponding to a position suitable for being held by the one hand finger of the user, and obtains, as the two or more related coordinates, coordinates of positions on the display unit that are corresponding to a position of the other hand finger of the user.

According to a fourth aspect of the present invention, in the first aspect of the present invention,
the display unit is foldable such that the two screens face toward each other taking a portion at or near a side where the two screens are adjacent as a valley-folding line, and
the gesture recognizing unit executes the processing command based on the fixed coordinate including a coordinate on or near the valley-folding line.

According to a fifth aspect of the present invention, in the first aspect of the present invention,
when the two or more related coordinates represent a changing form in which the coordinates move from one to the other of the two screens, the gesture recognizing unit recognizes and executes a predetermined page forwarding command corresponding to the changing form, and the display unit displays two images respectively associated with predetermined pages in a two-page center spread manner in the two screens, and displays images associated with pages incremented or decremented by a predetermined number according to the changing form when the page forwarding command is executed by the gesture recognizing unit.

According to a sixth aspect of the present invention, in the first aspect of the present invention, when the coordinates obtained by the input unit include previously determined coordinates successively for a predetermined time period, the gesture recognizing unit recognizes and executes a predetermined page forwarding command during this period, the previously determined coordinates being positioned near an outer circumference of the two screens and distant from the fixed coordinate by a predetermined distance, and the display unit displays two images respectively associated with predetermined pages in a two-page center spread manner in the two screens, and displays images associated with pages incremented or decremented by a predetermined number during the period at a predetermined time interval when the page forwarding command is recognized by the gesture recognizing unit.

According to a seventh aspect of the present invention, in the first aspect of the present invention, the display unit displays two images respectively associated with predetermined pages in a two-page center spread manner in the two screens, and when the two or more related coordinates represent a changing form in which the two or more related coordinates move from a portion near an end of the screen to a portion near a center of the screen at or near a portion at which the two screens are adjacent, the gesture recognizing unit recognizes a predetermined bookmark assigning command, and stores pages corresponding to the images displayed in the display unit.

According to an eighth aspect of the present invention, in the first aspect of the present invention, when the two or more related coordinates represent a changing form in which the two or more related coordinates move from a portion near one side to a portion near another side out of four outer sides of at least one square display window in the two screens, the gesture recognizing unit recognizes and executes a predetermined window form changing command corresponding to the changing form, and when the window form changing command is executed by the gesture recognizing unit, the display unit changes one of the number and a form of divisions of the window according to the changing form, and displays the images in the window in the form after the change.

According to a ninth aspect of the present invention, in the first aspect of the present invention, the gesture recognizing unit enters: a non-accepting state in which recognition and execution of the processing command are unallowed when the coordinates obtained by the input unit do not include a predetermined number of fixed coordinates out of a plurality of predetermined fixed coordinates at or near a portion at which the two screens are adjacent, and an accepting state in which recognition of the processing command is allowed when the coordinates obtained by the input unit include the predetermined number of fixed coordinates.

According to a tenth aspect of the present invention, in the first aspect of the present invention, during a time period in which the gesture recognizing unit is in the non-accepting state, the input unit performs at least one of an operation of limiting a range of coordinates to be obtained on the display unit to the fixed coordinate or near the fixed coordinate, and an operation of setting a time interval at which the coordinates on the display unit are to be obtained to be longer than a time period during which the gesture recognizing unit is in the accepting state, thereby obtaining the coordinates.

An eleventh aspect of the present invention provides a method of controlling a portable display device configured to be held by a user and having a display unit for displaying an image over two adjacent screens, the method including:

an input step of obtaining two or more coordinates of positions on the display unit, the positions being subjected to one of approach, contact, and press by the user; and a gesture recognizing step of recognizing and executing a previously stored processing command corresponding to a changing form of two or more related coordinates by chronologically associating the coordinates of the positions subjected to one of approach, contact, and press on the display unit and obtained in the input step, wherein the gesture recognizing step is in: a non-accepting state in which recognition and execution of the processing command are unallowed when the coordinates obtained in the input step do not include a previously determined fixed coordinate at or near a portion at which the two screens are adjacent, and an accepting state in which recognition of the processing command is allowed when the coordinates obtained in the input step include the fixed coordinate.

A twelfth aspect of the present invention provides a program for causing a portable display device having a display unit for displaying an image over two adjacent screens and configured to be held by a user to execute:

an input step of obtaining two or more coordinates of positions on the display unit, the positions being subjected to one of approach, contact, and press by the user; and a gesture recognizing step of recognizing and executing a previously stored processing command corresponding to a changing form of two or more related coordinates by chronologically associating the coordinates of the positions subjected to one of approach, contact, and press on the display unit and obtained in the input step, wherein the gesture recognizing step is in: a non-accepting state in which recognition and execution of the processing command are unallowed when the coordinates obtained in the input step do not include a previously determined fixed coordinate at or near a portion at which the two screens are adjacent, and an accepting state in which recognition of the processing command is allowed when the coordinates obtained in the input step include the fixed coordinate.

A thirteenth aspect of the present invention provides a computer-readable non-transitory recording medium having a program recorded therein, the program causing a portable display device having a display unit for displaying an image over two adjacent screens and configured to be held by a user to execute:

an input step of obtaining two or more coordinates of positions on the display unit, the positions being subjected to one of approach, contact, and press by the user; and a gesture recognizing step of recognizing and executing a previously stored processing command corresponding to a changing form of two or more related coordinates by chronologically associating the coordinates of the positions subjected to one of approach, contact, and press on the display unit and obtained in the input step, wherein the gesture recognizing step is in: a non-accepting state in which recognition and execution of the processing command are unallowed when the coordinates obtained in the input step do not include a previously determined fixed coordinate at or near a portion at which the two screens are adjacent, and an accepting state in which recognition of the processing command is allowed when the coordinates obtained in the input step include the fixed coordinate.

According to the first aspect of the present invention, the device enters: a non-accepting state in which recognition and execution of the processing command are unallowed when the coordinates obtained by the input unit do not include a predetermined fixed coordinate, and an accepting state in which recognition of the processing command is allowed when the coordinates obtained by the input unit include the fixed coordinate. Accordingly, pressing a fixed coordinate position with a thumb of one hand holding the device, for example, causes the portable display device to enter a state in which the gesture recognition can be accepted. Therefore, it is possible to conveniently cause the portable display device to enter the command accepting state when holding the device to allow the gesture recognition, and to enter the command non-accepting state typically when not holding the device, to prevent a command from being falsely executed due to an unintended contact and such to the display screen.

According to the second aspect of the present invention, pressing a previously determined fixed coordinate position at or near the portion at which the two screens are adjacent with a thumb of one hand holding the device, for example, causes the device to enter a state for accepting the gesture recognition. Therefore, it is possible to naturally cause the device to enter the command accepting state to allow the gesture recognition when holding the two-screen portable display device, and to enter the command non-accepting state when not holding the device to prevent a command from being falsely executed. In this manner, it is possible to achieve an interface for an input operation suitable for a two-screen display screen.

According to the third aspect of the present invention, the input unit obtains, as the fixed coordinate, a coordinate of positions that is corresponding to a position of one hand finger of the user holding the portable display device and that is corresponding to a position suitable for being held, and obtains, as the two or more related coordinates, coordinates of positions on the display unit that are corresponding to a position of the other hand finger of the user. Therefore, it is possible to conveniently cause the device to enter the command accepting state to allow the gesture recognition when holding the portable display device, and to enter the command non-accepting state when not holding the device to prevent a command from being falsely executed.

According to the fourth aspect of the present invention, the processing command is executed based on the fixed coordinate including a coordinate on or near the valley-folding line. Therefore, it is expected that the device be held like a printed book, for example, by pressing the thumb to hold the device along the valley-folding line, and it is possible to more naturally cause the device to enter the command accepting state to allow the gesture recognition, and to enter the command non-accepting state when not holding the device, to prevent a command from being falsely executed.

According to the fifth aspect of the present invention, when the two or more related coordinates represent a changing form in which the coordinates move from one to the other of the two screens, a predetermined page forwarding command corresponding to the changing form is recognized and executed by the gesture recognizing unit. Therefore, it is possible to facilitate the execution of the page forwarding by an intuitive gesture over two screens of flipping a page.

According to the sixth aspect of the present invention, when the coordinates obtained by the input unit include previously determined coordinates successively for a predetermined time period, a predetermined page forwarding command is recognized and executed during this period, the previously determined coordinates being positioned near an outer circumference of the two screens and distant from the fixed coordinate by a predetermined distance. Therefore, it is possible to facilitate the execution of the successive page forwarding by a simple motion such as continuously pressing the coordinate position.

According to the seventh aspect of the present invention, when the two or more related coordinates represent a changing form in which the two or more related coordinates move from a portion near an end of the screen to a portion near a center of the screen at or near a portion at which the two screens are adjacent, a predetermined bookmark assigning command corresponding to the changing form is recognized, and pages corresponding to the images displayed in the display unit are stored. Therefore, it is possible to facilitate the execution of bookmark application processing by a simple and intuitive gesture of applying a bookmark.

According to the eighth aspect of the present invention, when the two or more related coordinates represent a changing form in which the two or more related coordinates move from a portion near one side to a portion near another side out of four outer sides of at least one square display window in the two screens, a predetermined window form changing command corresponding to the changing form is recognized and executed. Therefore, it is possible to easily change the number or the form of divisions of the window by a simple and intuitive gesture.

According to the ninth aspect of the present invention, the gesture recognizing unit enters: a non-accepting state in which recognition and execution of the processing command are unallowed when the coordinates obtained by the input unit do not include a predetermined number of fixed coordinates out of the plurality of fixed coordinates, and an accepting state in which recognition of the processing command is allowed when the coordinates obtained by the input unit include the predetermined number of fixed coordinates. Therefore, it is possible to prevent the false detection from occurring as compared to the determination based on a single coordinate.

According to the tenth aspect of the present invention, during a time period in the non-accepting state, the input unit performs at least one of an operation of limiting a range of coordinates to be obtained on the display unit to the fixed coordinate or near the fixed coordinate, and an operation of setting a time interval at which the coordinates are to be obtained to be long, thereby obtaining the coordinates. Therefore, an operation, a signal and the like that are used to obtain a coordinate within a range other than the fixed coordinate can be eliminated and the number of times the coordinate per unit time is obtained can be reduced. Thus, it is possible to reduce power consumption during the non-accepting state.

According to the eleventh aspect of the present invention, it is possible to provide the same effect as that of the first aspect according to the present invention for a method of controlling a portable display device.

According to the twelfth aspect of the present invention, it is possible to provide the same effect as that of the first aspect according to the present invention for a program for a portable display device.

According to the thirteenth aspect of the present invention, it is possible to provide the same effect as that of the first aspect according to the present invention for a computer-readable non-transitory recording medium having a program for a portable display device recorded therein.

DETAILED DESCRIPTION OF THE INVENTION

1. Overall Device Configuration and Operation

Figure 1:
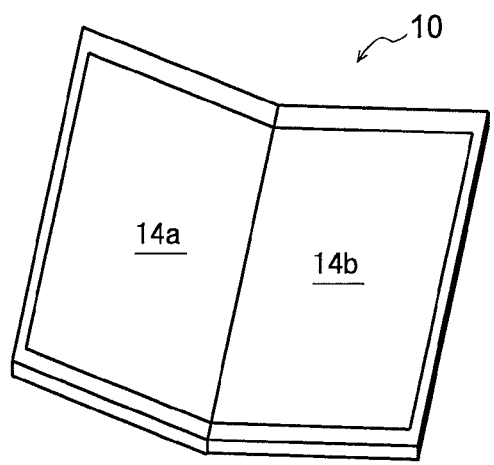
FIG. 1 is an external perspective view illustrating a portable information terminal according to one embodiment of the present invention.

FIG. 1 is an external perspective view illustrating a portable information terminal according to one embodiment of the present invention. A portable information terminal 10 is provided with a left display unit 14a and a right display unit 14b. The left display unit 14a and the right display unit 14b are configured such that the left display unit 14a and the right display unit 14b are foldable facing toward each other at central portion via a hinge unit that is not depicted. FIG. 1 illustrates the portable information terminal slightly folded at the central portion of the device that is near a side where the left display unit 14a and the right display unit 14b are adjacent, showing a size, a shape, and a weight balance that can be held with one hand like a book spread in the center.

More specifically, the portable information terminal 10 is held with one hand of a user by, as will be described later, holding a portion around a lower part of a center portion of the device with a thumb (typically, of a nondominant hand of the user), and the other side of the portion around the lower part with a different finger. The portable information terminal 10 has the shape and the weight balance that are suitable to be held with one hand in this manner.

Further, although not shown in FIG. 1, a well-known light guiding member (for example, a prism or a light guiding element configured by a bundle of single fibers whose diameter is a few micrometers called a fiber plate) is provided at a portion between a right side portion of the left display unit 14a and a left side portion of the right display unit 14b that corresponds to the central portion. By this light guiding member, a part of two images displayed in the left display unit 14a and the right display unit 14b is subjected to an optical path conversion, and a single image is displayed without a cut line or a seam (seamlessly). Further, there is provided a transparent touch panel over an upper surface (top surface) of the left display unit 14a and the right display unit 14b, and by pressing (contact) a screen with a finger (typically, of a dominant hand of the user) or a stylus pen, a position pressed on the screen is detected. Configurations of the display unit and the touch panel will be described later.

Figure 2:
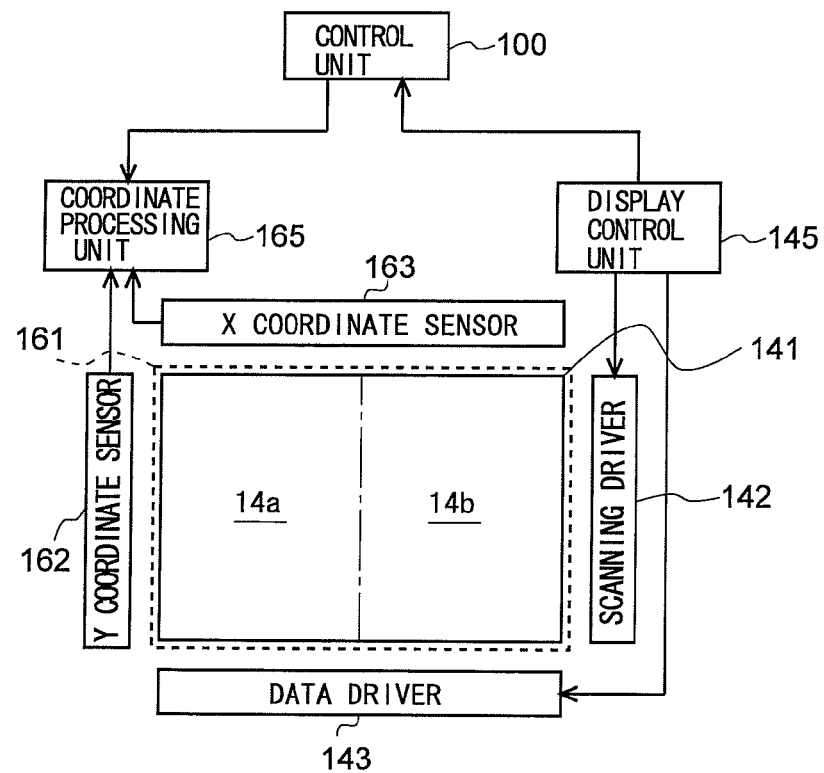
FIG. 2 is a block diagram illustrating a main configuration of a display unit and an input unit of the portable information terminal according to the embodiment.

FIG. 2 is a block diagram illustrating a main configuration of the display unit and an input unit of the portable information terminal according to one embodiment of the present invention. The portable information terminal 10 is provided with a control unit 100, two liquid crystal panels 141 respectively having the left display unit 14a and the right display unit 14b, scanning drivers 142 and data drivers 143 pairs of which respectively driving the two liquid crystal panels 141, a display control circuit 145, a matrix type resistive touch panel 161 provided over the two liquid crystal panels 141, an X coordinate sensor 163 and a Y coordinate sensor 162 for detecting a position on the touch panel 161 that is pressed by the user's finger or a stylus pen, and a coordinate processing unit 165.

Here, the touch panel 161 is not a general resistive type touch panel that senses a contact point of two resistance films that are facing each other in an analog manner, but provided with a large number of transparent electrodes parallelly provided in rows, and a large number of transparent electrodes parallelly provided in columns in a direction perpendicular to the transparent electrodes so as to face toward the transparent electrodes with a predetermined short distance therebetween. The X coordinate sensor 163 is connected to the electrodes provided in columns, and the Y coordinate sensor 162 is connected to the electrodes provided in rows. Therefore, when the electrodes in rows and in columns that intersect are brought into contact with each other at a position pressed by such as the user's finger or a stylus pen, the position can be detected by the X coordinate sensor 163 and the Y coordinate sensor 162. Thus, a large number of coordinates on the touch panel 161 can be individually recognized in a resolution according to an arrangement pitch of the electrodes.

Further, it is possible to employ various well-known types of touch panels, such as a matrix-type electrostatic capacitance type, an optical sensor type, and a mechanical sensor type, as long as the touch panel is capable of individually recognizing a large number of coordinates. Moreover, a plurality of touch panels of a type that can recognize only a single coordinate can be used in combination. For example, it is possible to separately provide a touch panel corresponding to the left display unit 14a, and a touch panel corresponding to the right display unit 14b, and a touch panel corresponding to a portion near a portion adjacent to these touch panels, which will be later described. In this manner, it is possible to reduce manufacturing costs. It should be noted that the touch panels of the electrostatic capacitance type and the optical sensor type are often preferred, as these types of touch panels do not generally require to be pressed by the finger, and only lightly touching the touch panel with the finger or causing the finger to approach the touch panel is sufficient, unlike the touch panel of the resistive type.

Further, the two liquid crystal panels 141 are active matrix-type liquid crystal panels, in which the scanning driver 142 and the data driver 143 for each liquid crystal panel performs selection of pixels and data assignment in the corresponding liquid crystal panel, thereby forming a single image. It should be noted that in order to display the single image in the two liquid crystal panels 141, and to uniquely associate the single image with detection coordinates in the touch panel 161, pixel positions on the liquid crystal panel 141 having the right display unit 14b can be treated as values obtained by adding a maximum value of an X coordinate (a pixel position at a left end) to pixel positions on the liquid crystal panels 141 having the left display unit 14a. Moreover, as described above, in order to display as a single image, the light guiding member is provided between the two liquid crystal panels 141 to perform seamless display.

Figure 3:
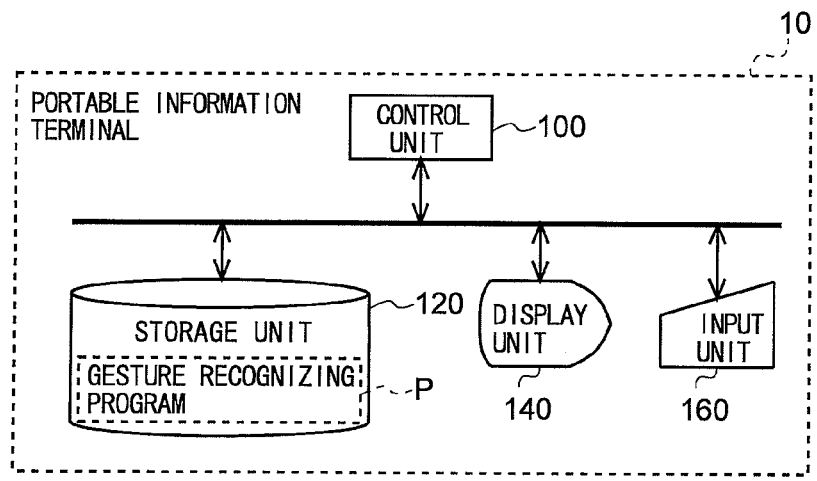
FIG. 3 is a block diagram illustrating a configuration of the portable information terminal according to the embodiment.

FIG. 3 is a block diagram illustrating a configuration of the portable information terminal according to the one embodiment of the present invention. The portable information terminal 10 is a device that performs predetermined processing based on a general (dedicated) operating system and predetermined application software, and provided with the control unit 100 having a CPU (Central Processing Unit) and a semiconductor memory such as a RAM, a storage unit 120 having a nonvolatile semiconductor memory such as an EPROM, a display unit 140 configured by such as a liquid crystal panel that will be later described, and an input unit 160 having an input operation device such as a touch panel.

The control unit 100 included in the portable information terminal 10 has a function of predetermined command processing performed by recognizing a gesture (described later) of the user accepted through the input unit 160. An operation of the control unit 100 will be described in detail later.

It should be noted that the function of the control unit 100 is achieved by the CPU executing a predetermined gesture recognizing program P (for example, application software for gesture recognition) stored in the semiconductor memory. Here, while the gesture recognizing program P is written in the EPROM and such at the time of manufacturing, the program can be written after the time of manufacturing, for example, through a CD-ROM or a different type of non-transitory recording medium as a computer-readable recording medium in which the program is recorded, or through a communication line. Then, upon performing a predetermined operation for activating the portable information terminal 10, a part or all of the gesture recognizing program P written in the storage unit 120 is transferred to the semiconductor memory such as the RAM to be temporary stored therein, and executed by the CPU in the control unit 100. This realizes processing to control the components of the control unit 100.

2. Overall Operation of Portable Information Terminal

Figure 4:
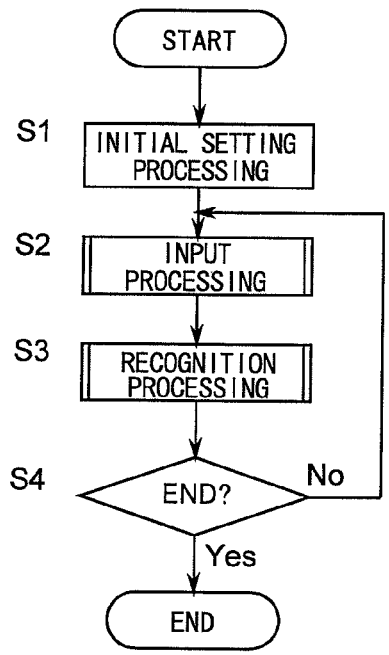
FIG. 4 is a flowchart showing an overall processing flow of the portable information terminal according to the embodiment.

Next, an overall operation of the portable information terminal 10 is described. FIG. 4 is a flowchart showing an overall processing flow of the portable information terminal 10. In step S1 (initial setting processing) shown in FIG. 4, the control unit 100 included in the portable information terminal 10 determines image data corresponding to an electronic document to be presented to the user, for example, typically by receiving a start instruction from the user. Further, the control unit 100 initializes values necessary for the processing that will be later described. In this case, the number of windows when initialized is 1 (the window is not divided).

Here, while various well-known application software can be installed in the portable information terminal 10, an explanation is given only to a reading mode and a window mode. The reading mode is a mode for browsing electric book data stored in the storage unit 120. The book data is image data including character data, and stored in association with a predetermined page like a printed book. Further, the window mode is a mode for instructing the number of windows and a form of division so as to display a plurality of application within one, two, or four windows. Here, for convenience of explanation, it is assumed that only processing corresponding to the two modes are performed.

Next, in step S2 (input processing), the image determined in step S1 is displayed in the display unit 140, and an input operation from the input unit 160 made by the user, in this case, an input operation by bringing the finger into contact, is accepted.

In step S3 (recognition processing), according to the input operation accepted in step S2, corresponding processing command is recognized, and an image corresponding to the recognized processing command is displayed in the display unit 140.

In step S4, an instruction to stop the device is given by the user, or it is determined whether or not the various processing is to be terminated by such as sleeping processing due to a lapse of a predetermined time. When the process is not terminated, the process returns to step S2 and is repeated (S4→S2→S3→S4). When the process is terminated, the portable information terminal 10 terminates the process once, and resumes the process typically when an instruction to activate the device is given by the user.

3. Input Processing Operation of Portable Information Terminal

Figure 5:
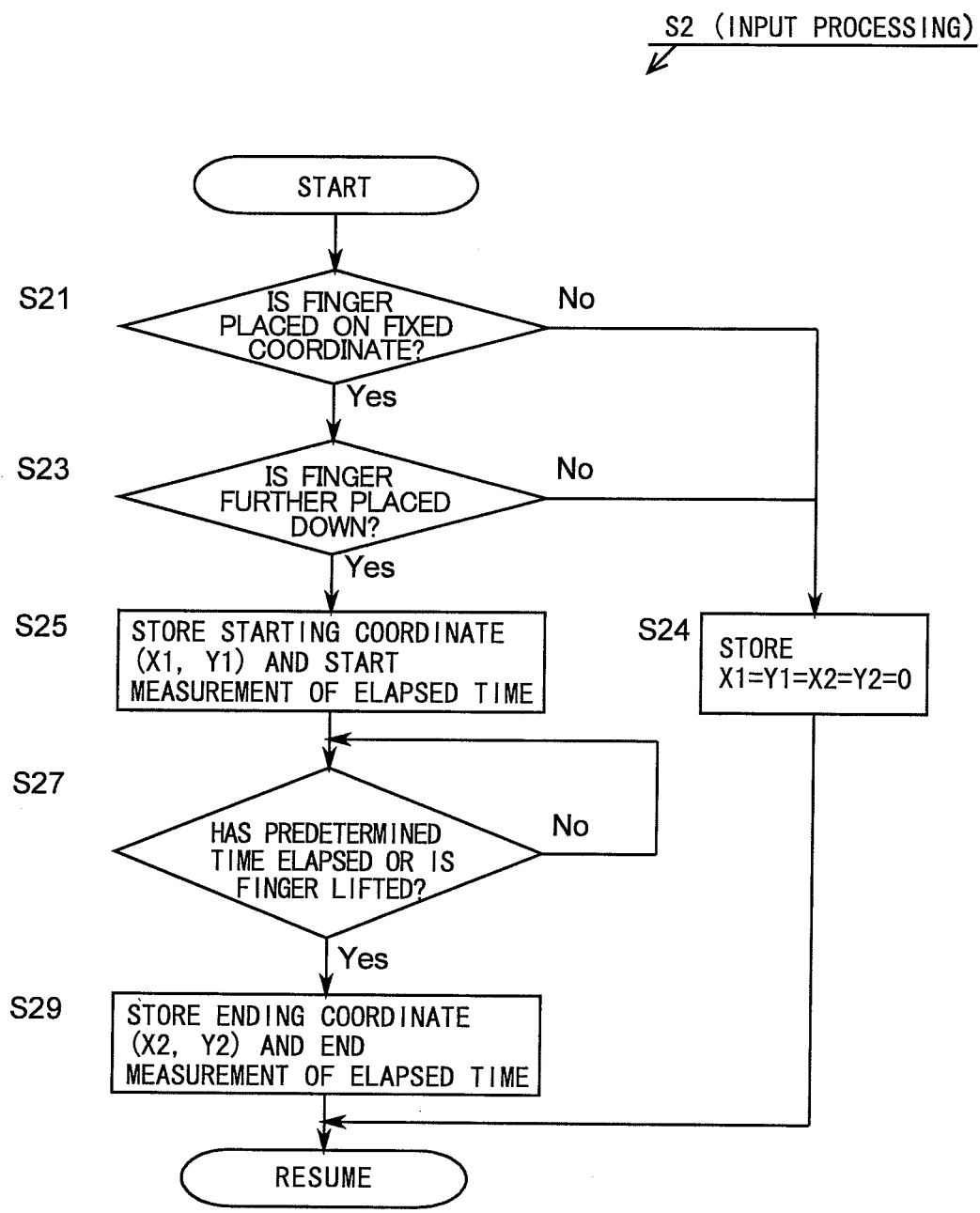
FIG. 5 is a flowchart showing a detailed flow of input processing (step S2) according to the embodiment.

Next, an operation in the input processing (step S2) of the portable information terminal 10 is described in detail. FIG. 5 is a flowchart showing a detailed flow of the input processing (step S2).

In step S21 shown in FIG. 5, the control unit 100 determines whether or not the finger is placed on a fixed coordinate corresponding to a previously determined position. Specifically, the control unit 100 compares and determines whether a group of coordinates accepted from the input unit 160 includes a coordinate within a fixed coordinate area. In the following description, the fixed coordinate area is described with reference to FIG. 6 and FIG. 7.

Figure 6:
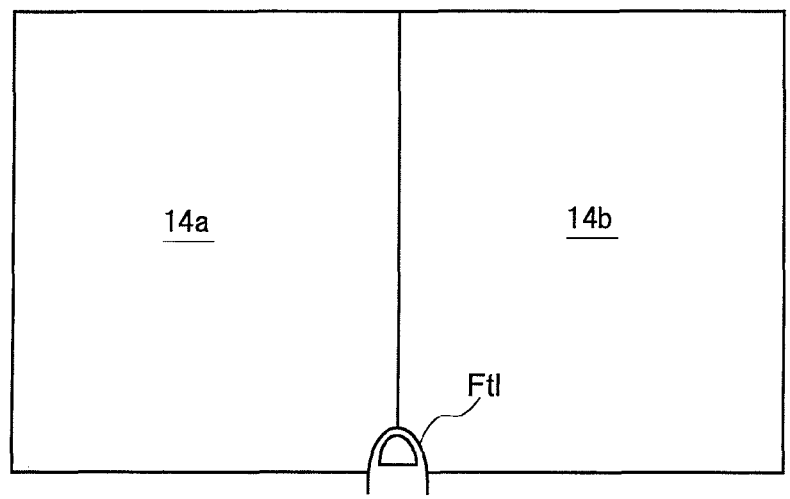
FIG. 6 is a view showing a positional relation between a display screen of the portable information terminal according to the embodiment and a left thumb of a user.
Figure 7:
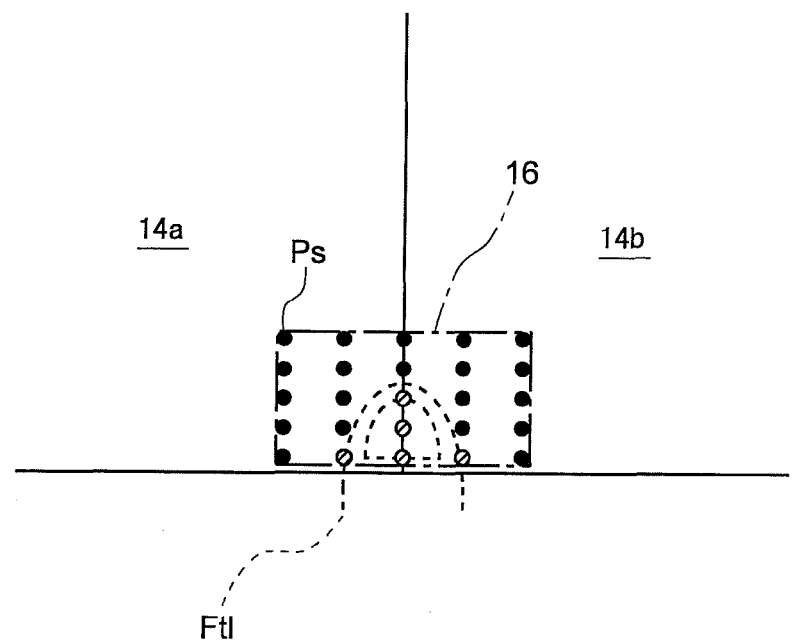
FIG. 7 is a view showing a fixed coordinate area in the embodiment.

FIG. 6 is a view showing a positional relation between a display screen of the portable information terminal and a left thumb of the user, and FIG. 7 is a view showing the fixed coordinate area in provided near the left thumb. As described above, the portable information terminal 10 is naturally held with one hand of the user by holding the portion around the lower part of the center portion of the terminal with a thumb (here, of a left hand, for convenience of explanation) of a nondominant hand of the user, and the other side of the portion around the lower part with a different finger. FIG. 6 shows a left thumb Ftl. It should be appreciated that it is possible to hold the terminal using such as a dominant hand or an artificial hand.

Further, as shown in FIG. 7, a fixed coordinate area 16 is provided at a lower part of an adjacent side between the left display unit 14a and the right display unit 14b. The fixed coordinate area 16 includes a plurality of detection points Ps with which coordinates of positions pressed by the input unit 160 can be detected. Among these, the detection points Ps that correspond to coordinates of positions that are actually being pressed are indicated by shaded circles. The coordinates corresponding to the shaded circles are a part or all of the group of the coordinates accepted from the input unit 160, and the control unit 100 determines whether or not any of the coordinates in the group overlaps with one or more (in order to avoid false detection, no smaller than a predetermined number that is two or more) of the coordinates within the fixed coordinate area. It should be noted that the above described method of determining whether or not the fixed coordinate area includes the coordinates corresponding to the position of the left thumb is a mere example, and any well-known method can be used for the determination.

In step S21, the control unit 100 determines whether or not the finger is placed on the fixed coordinate as described above. If it is determined that the finger has been placed (Yes in step S21), the control unit 100 enters a state in which a command can be accepted (hereinafter also referred to as a "command accepting state") that will be later described, and the process proceeds to step S23. Further, if it is determined that the finger has not been placed (No in step S21), the control unit 100 enters a state in which a command can not be accepted (hereinafter also referred to as a "command non-accepting state") that will be later described, and the input processing is terminated and the processing shown in FIG. 4 is resumed. It should be noted that it is also possible to employ a configuration in which a gesture other than a gesture that will be described later is recognized, and in which command processing corresponding to the recognized gesture (other than a command that will be later described) is performed.

Moreover, in the command non-accepting state, it is not necessary to perform related processing that should be performed in the command accepting state. Therefore, it is desirable that the sensors be driven and the data be processed such that power consumption for driving the sensors and for processing the data is reduced, such as by lowering drive frequencies of the X coordinate sensor 163 and the Y coordinate sensor 162 (sensor data readout frequencies) for performing the detection in the touch panel 161 (for example, performing the detection every 60 frames), by lowering a drive frequency of a light source when using an optical sensor, or by preventing the sensor data readout in an area other than the fixed coordinate area from being performed and the date from being processed by the coordinate processing unit 165b. It should be noted that when the state shifts to the command accepting state, the driving and the processing described above are resumed to a normal state.

Furthermore, it is also possible to employ a configuration in which a coordinate in the area other than the fixed coordinate area is detected by the touch panel 161, a coordinate in the fixed coordinate area is detected by a single-electrode resistive type (single) touch sensor or a mechanical sensor that is different from the touch panel 161, and the operation of the touch panel 161 may be completely terminated only in the command non-accepting state. This allows reduction of the power consumption in the command non-accepting state.

Next, in step S23, the control unit 100 determines whether or not a finger is placed on a portion other than the fixed coordinate area 16. Specifically, the control unit 100 compares and determines whether the group of the coordinates accepted from the input unit 160 includes a coordinate outside the fixed coordinate area 16. As a result of the determination, if it is determined that a different finger has been placed (Yes in step S23), the process proceeds to step S25. Alternatively, if it is determined that the different finger has not been placed (No in step S23), the control unit 100 initializes a starting coordinate and an ending coordinate (step S24), and the input processing is terminated and the processing shown in FIG. 4 is resumed. It should be noted that in the above determination, in order to avoid false detection as has been described above, it is preferable to compare and determine whether or not no smaller than two or a predetermined number of coordinates in the area other than the fixed coordinate area 16 are included.

Subsequently, in step S25, the control unit 100 stores a coordinate outside the fixed coordinate area 16 among the group of the coordinates accepted from the input unit 160 (when there are more than one, arbitrary one or an average coordinate of a group of contiguous coordinates) as a starting coordinate (X1, Y1) in the storage unit 120, and starts measuring elapsed time that is required for gesture recognition that will be described later. It should be noted that while the gesture normally means a form how a coordinate changes chronologically as the user's finger moves over the display unit, the gesture herein includes a form in which the coordinate does not change from a predetermined coordinate for predetermined time.

Next, in step S27, the control unit 100 determines whether or not the finger is lifted from the area other than the fixed coordinate area 16, and whether or not predetermined time has elapsed. Specifically, the control unit 100 compares and determines whether or not there is established one of conditions that the group of the coordinates accepted from the input unit 160 does not include the coordinate outside the fixed coordinate area 16 and that the predetermined time has elapsed. As a result of the determination, if it is determined that the different finger has been lifted or the predetermined time has elapsed (Yes in step S27), the process proceeds to step S29. Alternatively, if it is determined that the different finger has not been lifted and the predetermined time has not yet elapsed (No in step S25), this processing (S27) is repeated until it is determined that the different finger is lifted or the predetermined time has elapsed.

Although the predetermined time is set to be long enough so as not to be taken as a common gesture as time for general time-out processing, the predetermined time here is set in association with the inputted coordinate. Specifically, if the inputted coordinate does not change (over a predetermined range), a short time (for example, on the order of 1 second) is set, and the process proceeds to subsequent processing upon elapsing of this time. Alternatively, it is also possible to employ a configuration in which if the inputted coordinates are within the predetermined coordinate range associated with a successive page flipping operation that will be described later (specifically, predetermined ranges 33a and 33b described later and shown in FIG. 15), the short time is set, and the process proceeds to subsequent processing upon elapsing of this time. In such a case, it is desirable that the process proceeds to recognition processing (step S3) in a short time as the coordinate specification is possibly for the successive page flipping operation that will be described later. Further, it is also possible to set a shorter time (for example, on the order of 0.2 seconds) when the predetermined time elapses more than one time, so that a speed of the successive page flipping operation consequently increases.

It should be noted that the repeating processing described above is canceled by such as predetermined interrupt processing so that the process proceeds to processing in step S29.

Further, in the above determination, in order to avoid false detection as has been described above, it is preferable to compare and determine whether or not coordinates in the area other than the fixed coordinate area 16 are included, and whether or not no smaller than two or a predetermined number of coordinates are included.

Subsequently, in step S29, the control unit 100 stores a coordinate outside the fixed coordinate area 16 among the group of the coordinates most recently accepted from the input unit 160 (when there are more than one, arbitrary one or an average coordinate of a group of contiguous coordinates) as an ending coordinate (X2, Y2) in the storage unit 120, and the measurement of the elapsed time is terminated. Specifically, it is possible for the control unit 100 to store a coordinate immediately before the finger is lifted as the ending coordinate by, in step S27, continuously storing the coordinate outside the fixed coordinate area 16 among the group of the coordinates accepted from the input unit 160 (when there are more than one, arbitrary one or an average coordinate of a group of contiguous coordinates) as an ending coordinate (X2, Y2) in the storage unit 120. Then, the input processing is terminated and the processing shown in FIG. 4 is resumed.

4. Recognition Processing Operation of Portable Information Terminal

4.1 Overall Flow of Recognition Processing

Figure 8:
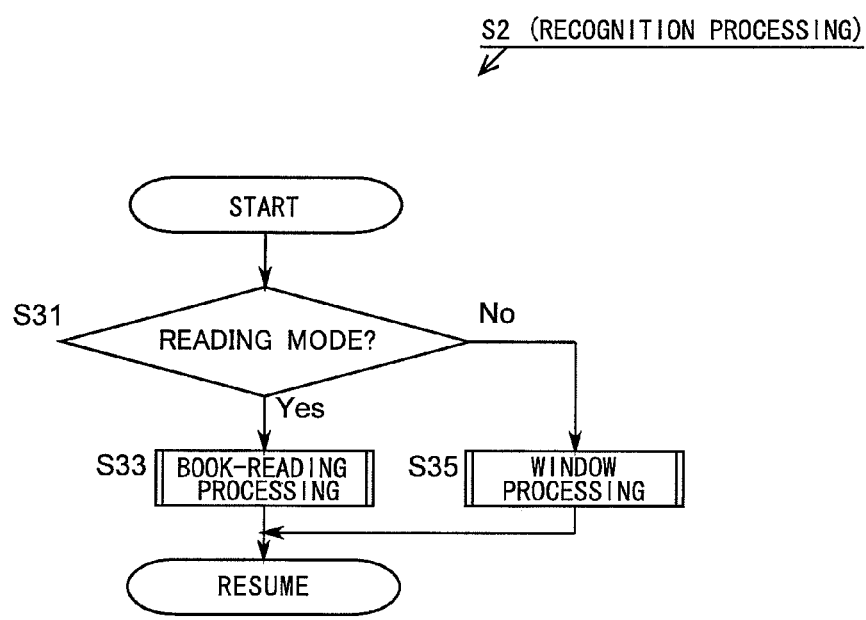
FIG. 8 is a flowchart showing a detailed flow of recognition processing (step S3) according to the embodiment.

Next, an operation in the recognition processing (step S3) of the portable information terminal 10 is described in detail. FIG. 8 is a flowchart showing a detailed flow of the recognition processing (step S3).

In step S31 shown in FIG. 8, the control unit 100 determines whether or not the reading mode is selected by the user. As a result of the determination, if it is determined to be the reading mode (Yes in step S31), book-reading processing in step S33 is performed. Alternatively, if it is determined to be not the reading mode (No in step S31), window processing in step S35 is performed. After the processing end, the recognition processing is terminated and the processing shown in FIG. 4 is resumed.

As described above, for convenience of explanation, it should be noted that only the two processing of the reading mode and the window mode are performed here. However, various well-known processing can be performed in practice. Next, the book-reading processing in the reading mode is described in detail.

4.2 Book-Reading Processing Operation in Reading Mode

Figure 9:
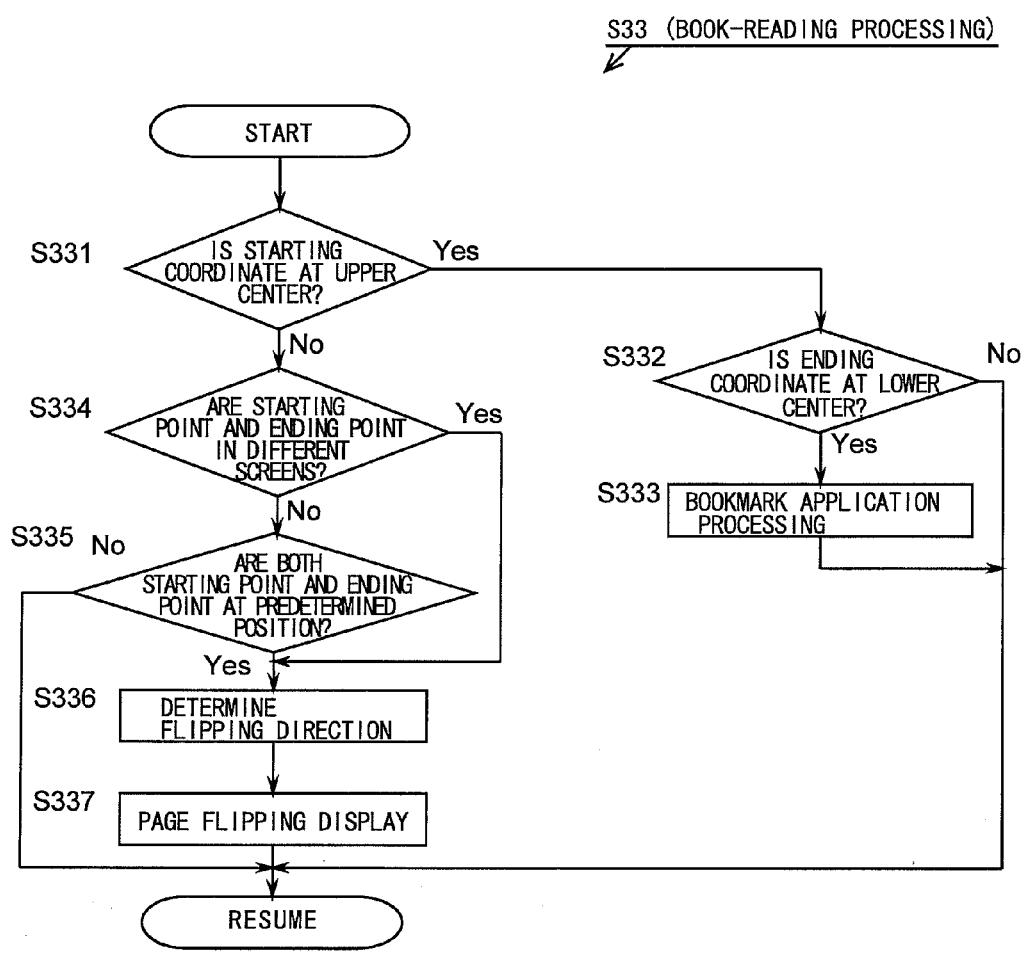
FIG. 9 is a flowchart showing a detailed flow of book-reading processing (step S33) according to the embodiment.

FIG. 9 is a flowchart showing a detailed flow of the book-reading processing (step S33). In step S331 shown in FIG. 9, the control unit 100 determines whether or not the starting coordinate (X1, Y1) obtained in step S25 shown in FIG. 5 is within a predetermined region at an upper center of the display unit.

Figure 10:
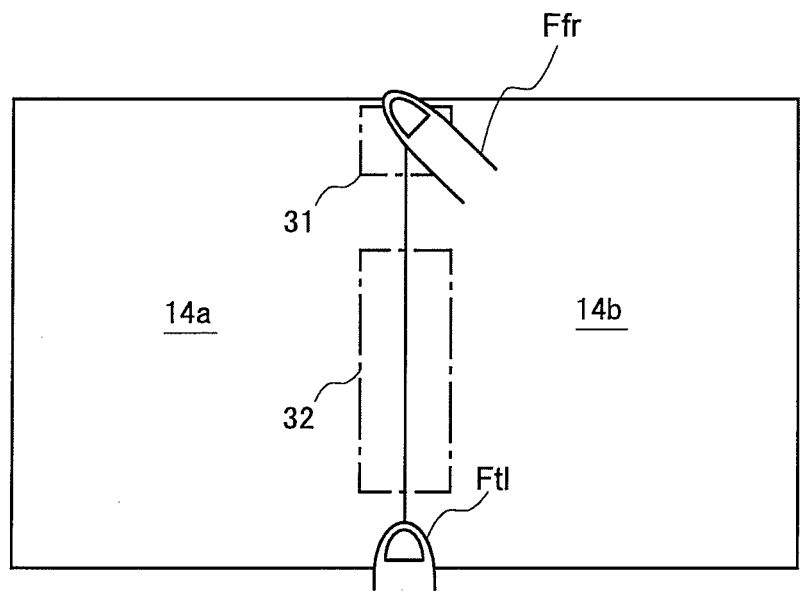
FIG. 10 is a view showing a predetermined region at an upper center of the display unit according to the embodiment.

FIG. 10 is a view showing the predetermined region at the upper center of the display unit. As shown in FIG. 10, when the upper center of the display unit is pressed (typically) with a right index finger Ffr, a coordinate corresponding to the pressed position is stored as the starting coordinate (X1, Y1). In this case, the right index finger Ffr presses a portion within a predetermined region 31 in the upper center, and therefore it is determined that the starting coordinate (X1, Y1) is within the predetermined region 31 in step S331.

As a result of the determination, if it is determined that the starting coordinate (X1, Y1) is within the predetermined region 31 (Yes in step S331), the process proceeds to step S332, and if not within the predetermined region 31 (No in step S331), the process proceeds to step S334.

Next, in step S332, the control unit 100 determines whether or not the ending coordinate (X2, Y2) obtained in step S29 shown in FIG. 5 is within a predetermined region at a lower center of the display unit.

Figure 11:
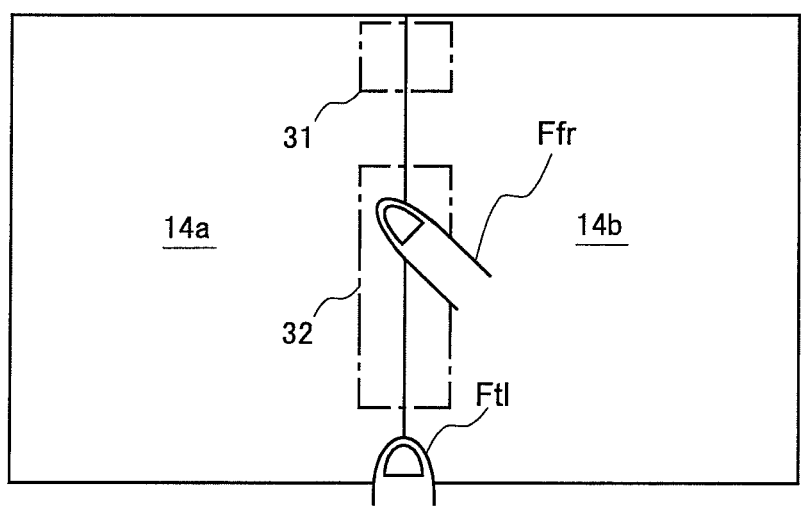
FIG. 11 is a view showing a predetermined region at a lower center of the display unit according to the embodiment.

FIG. 11 is a view showing the predetermined region at the lower center of the display unit. As shown in FIG. 11, when the right index finger Ffr is lifted at the lower center of the display unit after the upper center of the display unit is pressed with the right index finger Ffr as shown in FIG. 10, a coordinate corresponding to the position at which the finger has been lifted is stored as the ending coordinate (X2, Y2). In this case, the right index finger Ffr is lifted (separated from the display unit) within a predetermined region 32 in the lower center, and therefore it is determined that the ending coordinate (X2, Y2) is within the predetermined region 32 in step S332.

As a result of the determination, if it is determined that the ending coordinate (X2, Y2) is within the predetermined region 32 (Yes in step S332), the process proceeds to step S333, and if not within the predetermined region 32 (No in step S332), the book-reading processing is terminated, and the processing shown in FIG. 8 (and further the processing shown in FIG. 4) is resumed.

Figure 12:
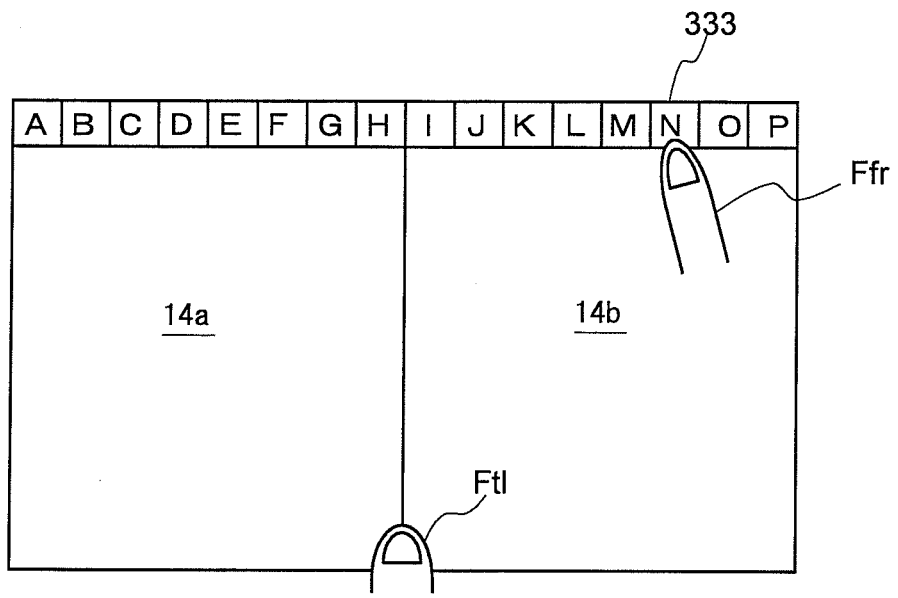
FIG. 12 is a view showing an example of the screen shown when performing bookmark application processing according to the embodiment.

Subsequently, in step S333 (bookmark application processing), the bookmark application processing as shown in FIG. 12 is performed, as it is determined that the user has inputted a gesture, in steps S331 and S332, as a command for executing the bookmark processing.

FIG. 12 is a view showing an example of the screen shown when performing the bookmark application processing. As shown in FIG. 12, a plurality of alphabets are presented in a bookmark section 333 displayed at an upper portion of the screen from the left display unit 14*a* to the right display unit 14*b*, and each alphabet corresponds to one bookmark. Specifically, when a position indicated by "N" in the bookmark section 333 is touched with the right index finger Ffr, page numbers of images corresponding to book data currently displayed in the left display unit 14*a* and the right display unit 14*b* are stored in the storage unit 120 in association with a bookmark "N". The information relating to the bookmark remains stored even after the operation of the device is terminated. If it is desired to browse the images of these pages again after a certain time period, by selecting the bookmark "N" in a bookmark calling screen similar to FIG. 12 but not shown in the drawing, the desired images can be immediately called without the user inputting such as the page number of the image corresponding to the book data.

As described above, by touching the screen with the right index finger from (the predetermined region 31 in) the upper center of the screen to (the predetermined region 32 in) the lower center of the screen, the pages are stored as if a bookmark is placed between the two displayed pages. Therefore, the user can carry out the bookmark application processing in a simple manner by an intuitive operation.

Next, in step S334 shown in FIG. 9, the control unit 100 determines whether or not the starting coordinate (X1, Y1) and the ending coordinate (X2, Y2) are in different screens. Specifically, it is determined if one of the starting coordinate (X1, Y1) and the ending coordinate (X2, Y2) is a coordinate within the left display unit 14*a* and the other of the starting coordinate (X1, Y1) and the ending coordinate (X2, Y2) is a coordinate within the right display unit 14*b*. This determines whether or not a gesture of the right index finger moving from the left display unit 14a to the right display unit 14b and vice versa, for example, has been inputted. In the following description, this is specifically described with reference to FIG. 13 and FIG. 14.

Figure 13:
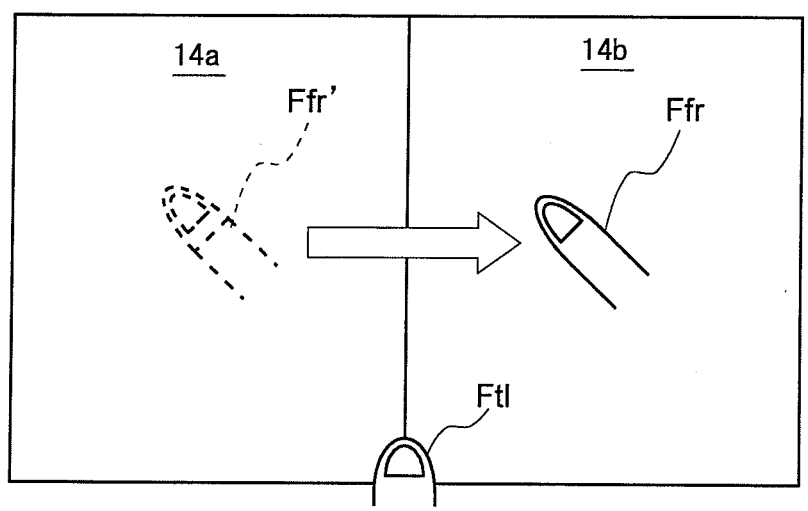
FIG. 13 is a view showing an example according to the embodiment, in which a gesture of a right index finger moving from a left screen to a right screen is inputted.
Figure 14:
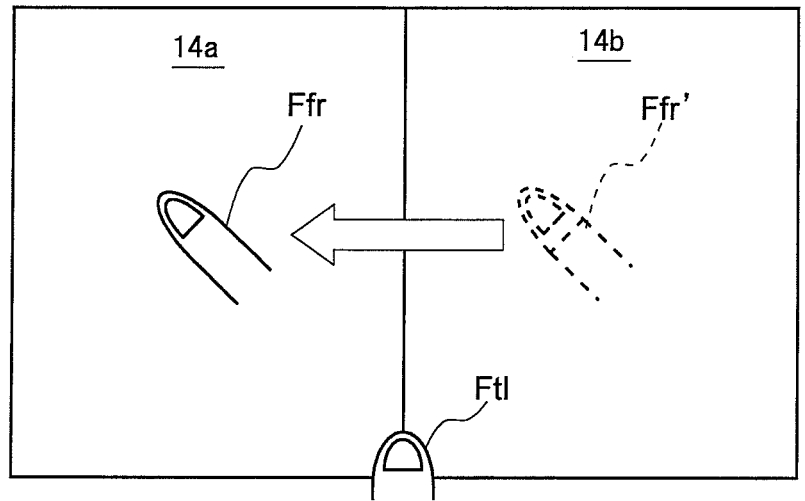
FIG. 14 is a view showing an example according to the embodiment, in which a gesture of the right index finger moving from the right screen to the left screen is inputted.

FIG. 13 is a view showing an example in which the gesture of the right index finger moving from a left screen to a right screen is inputted, and FIG. 14 is a view showing an example in which the gesture of the right index finger moving from the right screen to the left screen is inputted.

Referring to FIG. 13, as the left display unit 14a is pressed with a right index finger Ffr' (at a time point in the past), a coordinate corresponding to the pressed position is stored as the starting coordinate (X1, Y1). Then, as the right index finger Ffr is lifted from the right display unit 14b (at a current time point), a coordinate corresponding to the lifted position is stored as the ending coordinate (X2, Y2). Further, in FIG. 14, the gesture of an opposite direction is made. Accordingly, in this case, the starting coordinate and the ending coordinate that are stored are opposite of the case shown in FIG. 13.

In step S334, if it is determined that the gesture as a command for flipping a page has been made (Yes in step S334), the process proceeds to step S336, and a direction of the page flipping is determined. For example, if the starting coordinate is smaller than the ending coordinate (X1<X2), it is recognized that a gesture for flipping from left to right has been made, and the direction of the page flipping is determined to be a forward direction. Then, the process proceeds to step S337. Further, if it is determined that the gesture for flipping a page has not been made (No in step S334), the process proceeds to step S335.

Next, in step S335, the control unit 100 determines whether or not the starting coordinate (X1, Y1) and the ending coordinate (X2, Y2) are both at a predetermined position for instructing successive page flipping. This determines whether or not a (stationary) gesture of a right thumb pressing near a right end portion of the right display unit 14b for a predetermined time, for example, has been inputted. In the following description, this is specifically described with reference to FIG. 15.

Figure 15:
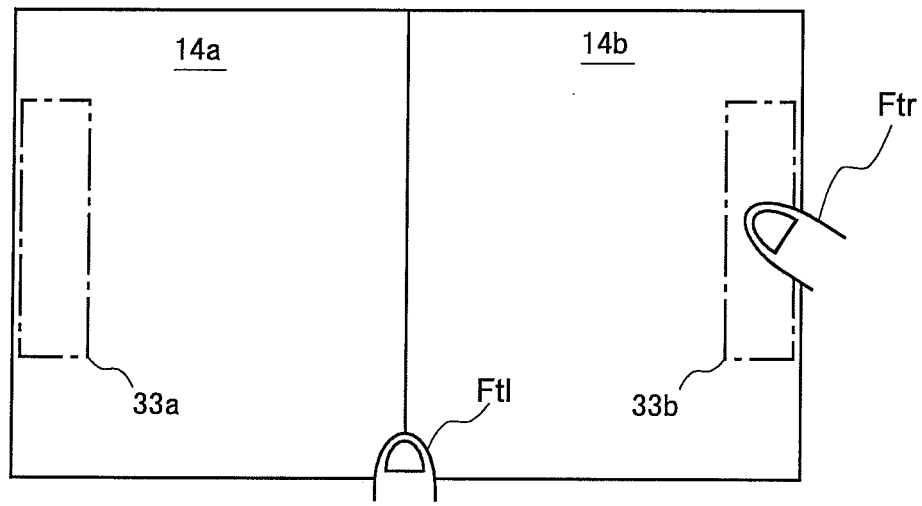
FIG. 15 is a view showing an example according to the embodiment, in which a gesture of a right thumb pressing near a right end portion in the right screen is inputted.

FIG. 15 is a view showing an example in which the gesture of the right thumb pressing near the right end portion in the right screen is inputted. Referring to FIG. 15, as a right thumb Ftr presses a predetermined region 33b for instructing successive page flipping that is provided near the right end portion of the right display unit 14b, a coordinate corresponding to the pressed position is stored as the starting coordinate (X1, Y1). Then, if the predetermined region 33b is kept being pressed as it is after a predetermined time elapses, the coordinate corresponding to this position is stored as the ending coordinate (X2, Y2) even if the right thumb Ftr is not lifted.

Specifically, as previously described according to step S27 shown in FIG. 5, if the inputted coordinate does not change (over the predetermined range), the short time (for example, on the order of 1 second) is set as the predetermined time, and the processing in subsequent step S29 is performed upon elapsing of this time, and the ending coordinate (X2, Y2) is stored. Therefore, if the predetermined region 33b is kept being pressed, the processing including the processing in step S335 and processing in step S337 that will be described later are repeated every predetermined short time (for example, 1 second), and the processing for flipping a page in the forward direction is repeated. Further, if the predetermined region 33a shown in FIG. 15 is kept being pressed with the right index finger Ffr, for example, the processing for flipping a page in an opposite direction is repeated.

In step S335, if it is determined that the stationary gesture as a command for successively flipping a page has been inputted (Yes in step S335), the process proceeds to step S336, and a direction of the page flipping is determined. For example, if the predetermined region 33b in the right display unit 14b is pressed, it is recognized that a stationary gesture for flipping a page from left to right has been made, and the direction of the page flipping is determined to be the forward direction. Then, the process proceeds to step S337. Further, if it is determined that the gesture for successively flipping a page has not been made (No in step S335), it is determined that a command relating to the book-reading processing has not finally been inputted (including the case in which the starting coordinate and the ending coordinate are initialized). Therefore, the book-reading processing is terminated, and the processing shown in FIG. 8 (and further the processing shown in FIG. 4) is resumed.

Subsequently, in step S337, according to the direction of the page flipping determined in step S335, images corresponding to pages of numbers incremented or decremented by two from the current pages are respectively displayed in the left display unit 14a and the right display unit 14b. Then, the book-reading processing is terminated, and the processing shown in FIG. 8 (and further the processing shown in FIG. 4) is resumed.

It should be noted that the number of pages incremented or decremented according to the direction of the page flipping is generally two, but it is possible to employ a configuration in which this number is set by the user as needed. Further, for example, it is possible to employ a configuration in which the number of pages to be flipped changes as needed, according to such as a distance or a positional relation between the starting coordinate and the ending coordinate, or elapsed time from the input of the starting coordinate to the input of the ending coordinate. Examples can include a configuration in which the number of pages to be flipped increases as the distance between the starting coordinate and the ending coordinate becomes larger, or the number of pages to be flipped increases as the elapsed time is shorter (that is, as the gesture is made more quickly). Next, the window processing in the window mode is described in detail.

4.3 Window Processing Operation in Window Mode

Figure 16:
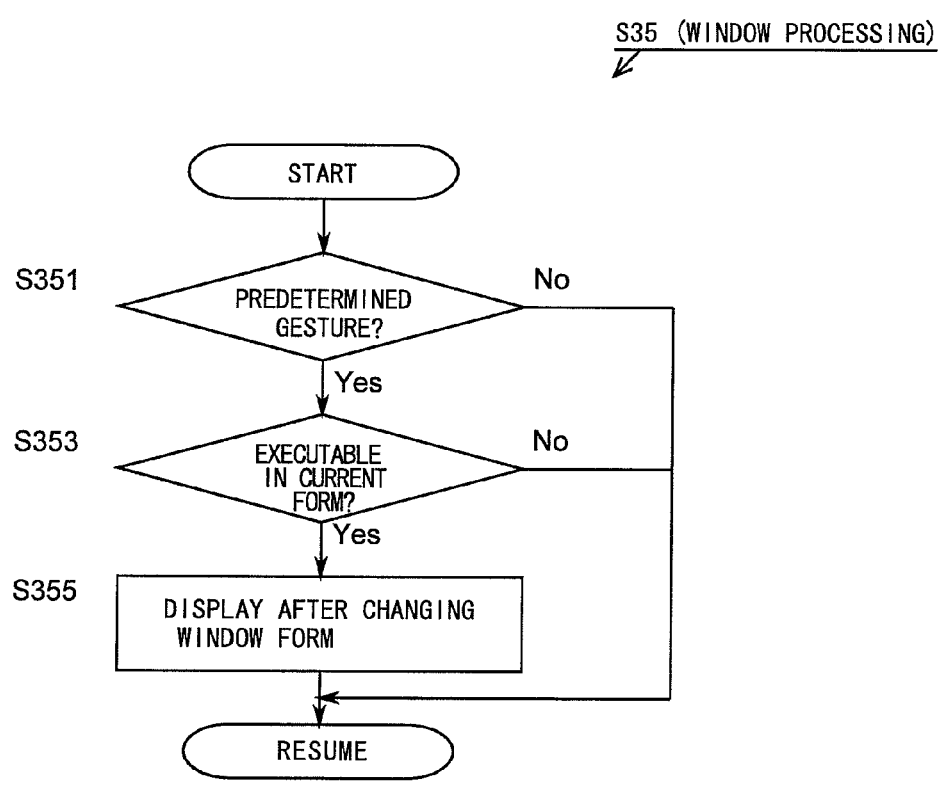
FIG. 16 is a flowchart showing a detailed flow of window processing (step S35) according to the embodiment.

FIG. 16 is a flowchart showing a detailed flow of the window processing (step S35). In step S351 shown in FIG. 16, the control unit 100 determines, based on the starting coordinate (X1, Y1) and the ending coordinate (X2, Y2) that have been obtained in step S25 shown in FIG. 5, whether or not a gesture that has been inputted by the user matches any of gestures corresponding to commands for executing previously determined window processing. The gestures are previously set in association with commands for changing a form of the window from the current state, more particularly, increasing or decreasing the dividing number of the window, or changing a form of divisions of the window (in this case, dividing vertically or horizontally). A relation between the gestures and changing forms of the window is described with reference to FIG. 17.

Figure 17:
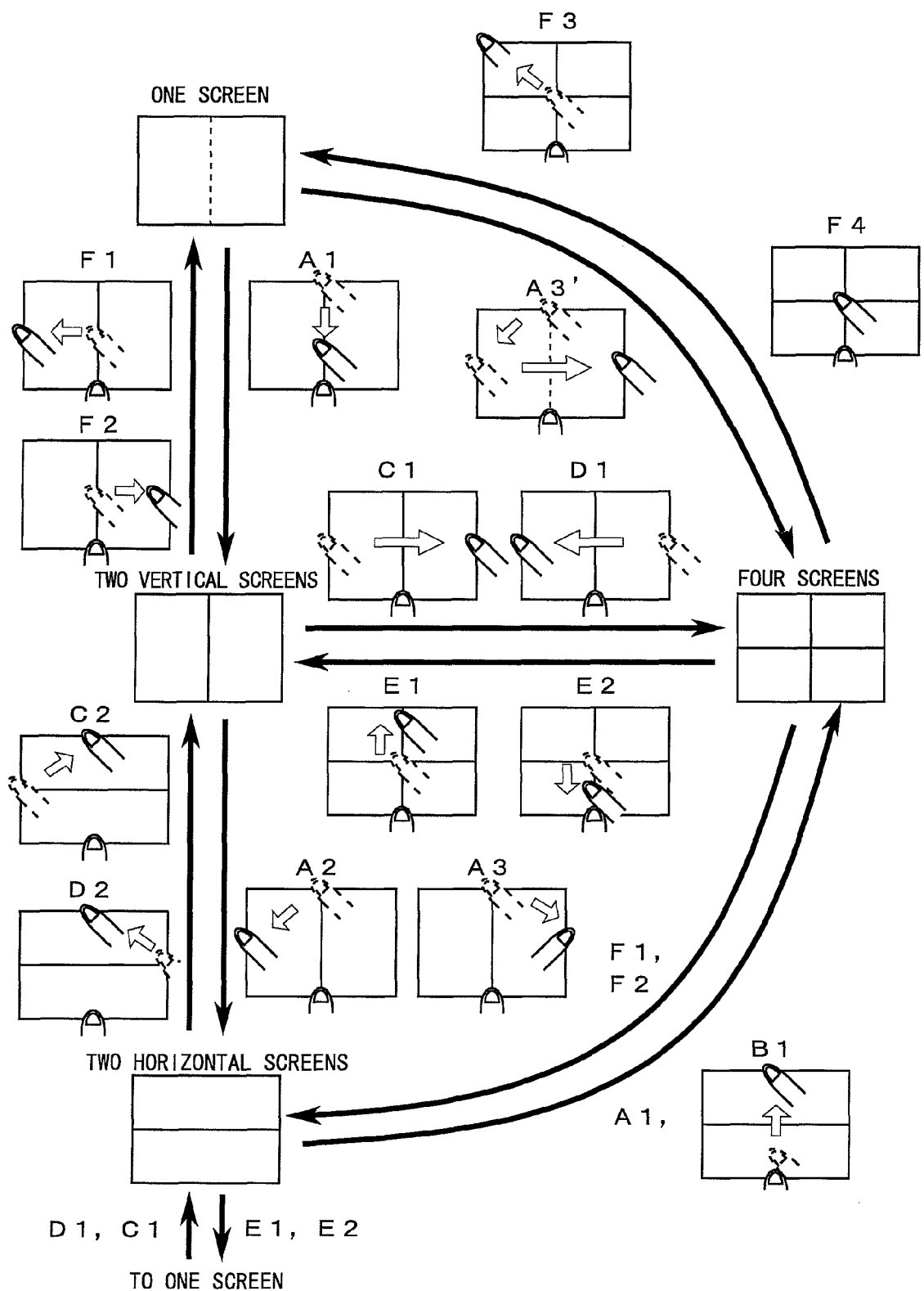
FIG. 17 is a view showing a relation between changing forms of a window and previously determined gestures according to the embodiment.

FIG. 17 is a view showing the relation between changing forms of the window and previously determined gestures. Referring to FIG. 17, four forms of the window are set: (seemingly) one screen constituted by the left display unit 14a and the right display unit 14b, two vertical screens divided at the center right and left (vertically divided), two horizontal screens divided at the center top and bottom (horizontally divided), and four screens divided top-bottom and right-left. Transitions from one of these window forms to another are shown by arrows, and gestures set as commands for instructing the transitions (changes) of the window form are briefly illustrated near the corresponding arrows.

These gestures include gestures A1-A3 having the upper center of the screen as the starting coordinate, a gesture B1 having the lower center of the screen as the starting coordinate, gestures C1 and C2 having the left end center portion of the screen as the starting coordinate, gestures D1 and D2 having the right end center portion of the screen as the starting coordinate, gestures E1 and E2 having a portion along right and left directions from the center portion of the screen as the starting coordinate, and gestures F1-F4 having the center portion of the screen as the starting coordinate. FIG. 17 also shows a gesture A3' having the center portion of the screen as the starting coordinate, the left end center portion of the screen as the intermediate point coordinate, and the right end center portion of the screen as the ending coordinate. However, for convenience of explanation here, the recognition of the intermediate coordinate is omitted, and the gesture A3' is considered to be the same as the gesture A3. It should be appreciated that in order to correctly recognize the gesture A3', it is possible to successively detect the intermediate point coordinates during a time period from bringing down to lifting up of the right index finger Ffr and to determine whether or not any of the intermediate point coordinates is included within the predetermined region of the left end center portion of the screen.

It should be noted that while these gestures are a practical example conceived so that the user can intuitively learn, these are mere illustrations and any practical example can be employed as long as a from is easy to recognize or remember for the user. Further, although the numbers of divisions of the window is 1 (undivided), 2, or 4, for convenience of explanation here, but the number of division is not particularly limited. In addition, the window can be divided in any from of division such as horizontally dividing into four or dividing in a well-known special form.

Here, in order to change the window from one screen to two vertical screens, the gesture A1 can be performed taking the upper center of the screen as the starting coordinate and the lower center of the screen as the ending coordinate. It should be noted that although this is substantially the same as the gesture for executing the bookmark processing, as described according to step S31 of FIG. 8, when (the operation mode selected by the user is) in the reading mode, the gesture is recognized as the gesture for executing the bookmark processing as the book-reading processing, and when not in the reading mode, the gesture is recognized as the gesture for changing the form of the window as the window processing.

Further, in order to change the window from two vertical screens to two horizontal screens, the gestures A2 and A3 can be performed as shown in FIG. 17, and in order to change the window from two horizontal screens to one screen, the gestures E1 and E2 can be performed as shown in FIG. 17.

Moreover, for example, in order to change the window from four screens to one screen, one of the gesture F3 taking the center portion of the screen as the starting coordinate and a portion near an upper left end of the screen as the ending coordinate, and the gesture F4 taking the center portion of the screen as the starting coordinate and the same position as the ending coordinate by keeping pressing this position for the predetermined time can be performed. It should be noted here that, the gesture F3 includes a gesture taking the center portion of the screen as the starting coordinate and a portion near one of an upper right end, a lower right end, and a lower left end of the screen as the ending coordinate. Further, the other gestures for changing the window form are apparent by reference to FIG. 17, and a detailed explanation is omitted.

As described above, in step S351 shown in FIG. 16, the control unit 100 determines whether or not the inputted gesture matches any of the gestures shown in FIG. 17, and if the gesture does not match as a result of the determination (No in step S351), a gesture corresponding to a command for executing the window processing has not been inputted, the window processing is terminated and the processing shown in FIG. 8 (and further the processing shown in FIG. 4) is resumed. Alternatively, if the gesture matches (Yes in step S351), the process proceeds to step S353.

In step S353, the control unit 100 determines whether or not command processing corresponding to the inputted gesture is executable in the current window form. As a result of the determination, if it is determined to be unexecutable (No in step S353), for example, if the gesture F1 is inputted when the screen is one screen, there is no window form to be transited (changed), and corresponding processing command (here, changing processing from two vertical screens to one screen, or from two horizontal screens to four screens) is unexecutable, and the processing is terminated. If it is determined to be executable (Yes in step S353), the form of the window is caused to change according to command processing corresponding to the gesture (step S355), and then the window processing is terminated and the processing shown in FIG. 8 (and further the processing shown in FIG. 4) is resumed.

5. Effects

As described above, according to this embodiment, a portable display device that is sufficiently small to be held with one hand enters a state in which a gesture can be accepted when a fixed coordinate position near a central portion between the two screens is pressed with the thumb of one hand holding the device, and a command for executing the book-reading processing or the window processing is accepted by a predetermined gesture inputted typically made by the finger of the other hand. Therefore, holding the two-screen portable display device conveniently and naturally causes the device to enter the command accepting state to allow gesture recognition, and when the portable display device is not held, the device enters the command non-accepting state to prevent a command from being falsely executed due to an unintended contact and such to the display screen. In this manner, the portable display device according to this embodiment can provide an interface for input operations suitable for a two-screen display screen.

6. Modified Examples

According to the embodiment, various gestures corresponding to commands for executing the bookmark application processing, the page flipping processing, the window processing, and such are described, but these gestures are mere examples. Any gestures that can be recognized as a changing form of the two or more associated coordinates by chronologically associating the inputted coordinates can be included, or processing command previously stored so as to be associated with these gestures may include any processing to be executed in the potable display device, as long as the device enters the command non-accepting state when the inputted coordinates do not include coordinates within the fixed coordinate area, and enters the command accepting state when the inputted coordinates include coordinates within the fixed coordinate area. For example, it is possible to realize an operation for executing a command for enlarging an image displayed in the right display unit 14b by making a gesture of pressing the fixed coordinate position near the central portion between the two screens with the thumb of one hand holding the device, and of placing the thumb and the index finger of the other hand on the right display unit 14b and spreading the fingers, or by making a gesture of moving the hand finger of the other hand from lower left to upper right of the right display unit 14b. Alternatively, to the contrary, it is possible to realize an operation for executing a command for reducing an image displayed in the right display unit 14b by making a gesture of pressing the fixed coordinate position near the central portion between the two screens with the thumb of one hand holding the device, and of placing the thumb and the index finger of the other hand on the right display unit 14b and contracting the fingers, or by making a gesture of moving the hand finger of the other hand from upper right to lower left of the right display unit 14b.

According to this embodiment, it is described that the fixed coordinate position near the central portion between the two screens is pressed with the thumb of one hand holding the portable display device. This is because it is generally configured such that a portion near the central portion between the two screens can be held most easily. However, there is a case in which a position that the user thinks can be held most easily is different from this position, and or a case in which attaching accessories to the device changes the position that generally can be held most easily. Therefore, the fixed coordinate position can be altered to a predetermined position that is distant from the portion near the central portion between the two screens, for example, to such as a portion near a central portion of the left end of the left display unit 14a.

According to this embodiment, the recognition processing (S3) is performed after the input processing (S2) ends. However, such processing steps (including other processing steps) are mere examples for convenience of explanation, and the processing can be performed integrally or well-known processing steps can be employed such as performing event-driven type processing.

According to this embodiment, the types of the gestures and the commands associated with the gestures (processing operations) are previously and fixedly stored. However, the association can be freely set by the user or by an application.

According to this embodiment, the description is given taking the example of the portable display device having two screens. However, the device can have three or more screens as long as the above described gestures can be made for two adjacent screens of the three or more screens.

According to this embodiment, the ending coordinate is the position at the moment when the finger is lifted. However, the ending coordinate can be determined at a time point when the finger is separated from the display unit for a predetermined time. By doing so, when a gesture made over two screens is inputted in a state in which the left display unit 14a and the right display unit 14b are slightly valley-folded, and when the finger is lifted for a moment at the portion near the central portion, for example, a position where the finger is last lifted (for over the predetermined time) is taken as the ending coordinate, and it is possible to recognize the gesture as a successive gesture as a whole.

According to this embodiment, the gesture is recognized based on the starting coordinate and the ending coordinate (as well as the elapsed time). However, it is possible to use various well-known methods for recognizing the gestures. For example, the gesture can be recognized by well-known pattern recognition, by a predetermined vector operation, or by determining which one of the gestures corresponds based on a change in a group of the related (successive) coordinates stored every unit time.

According to this embodiment, there is no gap between the left display unit 14a and the right display unit 14b (seamless), but a certain degree of a gap may present. However, it is necessary that the gap can be pressed typically with the thumb, and the pressed state can be detected, and it is desirable that there be little unevenness so that a gesture over right and left screens can be made as described above.

According to this embodiment, the gesture recognition described above is implemented in the portable information terminal. However, it is possible to implement the gesture recognition in any well-known device, such as a mobile telephone, an electronic personal organizer, an electronic dictionary, an electronic book reader, or a mobile Internet terminal, as long as the portable display device can be held by the user.

The present invention is applied, for example, to a portable display device having a touch panel, and suitable for a portable display device having a two-screen display unit and a touch panel capable of detecting a coordinate of a position approached or pressed on the display unit.

The invention claimed is:

1. A portable display device configured to be held by a user, the device comprising:
    a display unit configured to display images respectively in two adjacent screens;
    an input unit configured to obtain two or more coordinates of positions on the display unit, the positions being subjected to one of approach, contact, and press by the user; and
    a gesture recognizing unit configured to recognize and execute a previously stored processing command corresponding to a changing form of two or more related coordinates by chronologically associating the coordinates of the positions subjected to one of approach, contact, and press on the display unit and obtained by the input unit, wherein
    the gesture recognizing unit enters: a non-accepting state in which recognition and execution of the processing command are unallowed when the coordinates obtained by the input unit do not include a predetermined fixed coordinate, and an accepting state in which recognition of the processing command is allowed when the coordinates obtained by the input unit include the fixed coordinate; and
    the input unit obtains, as the fixed coordinate, a predetermined fixed coordinate of a position on the display unit that corresponds to a position of one finger of the user and that corresponds to a position suitable for holding the portable display device by one hand of the user.

2. The portable display device according to claim 1, wherein
    the gesture recognizing unit executes the processing command based on the fixed coordinate that have been previously determined, the fixed coordinate being located in a fixed coordinate area that includes a part of an adjacent side between the two screens.

3. The portable display device according to claim 1, wherein
    the input unit obtains, as the two or more related coordinates, coordinates of positions on the display unit that are corresponding to a position of another finger of the user.

4. The portable display device according to claim 1, wherein
the display unit is foldable such that the two screens face toward each other taking a portion at or near a side where the two screens are adjacent as a valley-folding line, and
the gesture recognizing unit executes the processing command based on the fixed coordinate including a coordinate on or near the valley-folding line.

5. The portable display device according to claim 1, wherein
when the two or more related coordinates represent a changing form in which the coordinates move from one to the other of the two screens, the gesture recognizing unit recognizes and executes a predetermined page forwarding command corresponding to the changing form, and
the display unit displays two images respectively associated with predetermined pages in a two-page center spread manner in the two screens, and displays images associated with pages incremented or decremented by a predetermined number according to the changing form when the page forwarding command is executed by the gesture recognizing unit.

6. The portable display device according to claim 1, wherein
when the coordinates obtained by the input unit include previously determined coordinates successively for a predetermined time period, the gesture recognizing unit recognizes and executes a predetermined page forwarding command during this period, the previously determined coordinates being positioned near an outer circumference of the two screens and distant from the fixed coordinate by a predetermined distance, and
the display unit displays two images respectively associated with predetermined pages in a two-page center spread manner in the two screens, and displays images associated with pages incremented or decremented by a predetermined number during the period at a predetermined time interval when the page forwarding command is recognized by the gesture recognizing unit.

7. The portable display device according to claim 1, wherein
the display unit displays two images respectively associated with predetermined pages in a two-page center spread manner in the two screens, and
when the two or more related coordinates represent a changing form in which the two or more related coordinates move from a portion near an end of the screen to a portion near a center of the screen at or near a portion at which the two screens are adjacent, the gesture recognizing unit recognizes a predetermined bookmark assigning command, and stores pages corresponding to the images displayed in the display unit.

8. The portable display device according to claim 1, wherein
when the two or more related coordinates represent a changing form in which the two or more related coordinates move from a portion near one side to a portion near another side out of four outer sides of at least one square display window in the two screens, the gesture recognizing unit recognizes and executes a predetermined window form changing command corresponding to the changing form, and
when the window form changing command is executed by the gesture recognizing unit, the display unit changes one of the number and a form of divisions of the window according to the changing form, and displays the images in the window in the form after the change.

9. The portable display device according to claim 1, wherein
the gesture recognizing unit enters: a non-accepting state in which recognition and execution of the processing command are unallowed when the coordinates obtained by the input unit do not include a predetermined number of fixed coordinates out of a plurality of predetermined fixed coordinates at or near a portion at which the two screens are adjacent, and an accepting state in which recognition of the processing command is allowed when the coordinates obtained by the input unit include the predetermined number of fixed coordinates.

10. The portable display device according to claim 1, wherein
during a time period in which the gesture recognizing unit is in the non-accepting state, the input unit performs at least one of an operation of limiting a range of coordinates to be obtained on the display unit to the fixed coordinate or near the fixed coordinate, and an operation of setting a time interval at which the coordinates on the display unit are to be obtained to be longer than a time period during which the gesture recognizing unit is in the accepting state, thereby obtaining the coordinates.

11. A method of controlling a portable display device configured to be held by a user and having a display unit for displaying an image over two adjacent screens, the method comprising:
an input step of obtaining two or more coordinates of positions on the display unit, the positions being subjected to one of approach, contact, and press by the user; and
a gesture recognizing step of recognizing and executing a previously stored processing command corresponding to a changing form of two or more related coordinates by chronologically associating the coordinates of the positions subjected to one of approach, contact, and press on the display unit and obtained in the input step, wherein
the gesture recognizing step is in: a non-accepting state in which recognition and execution of the processing command are unallowed when the coordinates obtained in the input step do not include a previously determined fixed coordinate of a position on the display unit that corresponds to a position of one finger of the user and that corresponds to a position suitable for holding the portable display device by one hand of the user, and an accepting state in which recognition of the processing command is allowed when the coordinates obtained in the input step include the fixed coordinate.

12. A computer-readable non-transitory recording medium having a program recorded therein, the program causing a portable display device having a display unit for displaying an image over two adjacent screens and configured to be held by a user to execute:
an input step of obtaining two or more coordinates of positions on the display unit, the positions being subjected to one of approach, contact, and press by the user; and
a gesture recognizing step of recognizing and executing a previously stored processing command corresponding to a changing form of two or more related coordinates by chronologically associating the coordinates of the positions subjected to one of approach, contact, and press on the display unit and obtained in the input step, wherein
the gesture recognizing step is in: a non-accepting state in which recognition and execution of the processing command are unallowed when the coordinates obtained in the input step do not include a previously determined fixed coordinate of a position on the display unit that corresponds to a position of one finger of the user and that corresponds to a position suitable for holding the portable display device by one hand of the user, and an accepting state in which recognition of the processing command is allowed when the coordinates obtained in the input step include the fixed coordinate.

* * * * *